Aug. 15, 1933.   V. LOUGHEED   1,922,311
AEROPLANE WING STRUCTURE AND METHOD OF MAKING THE SAME
Filed April 6, 1931   2 Sheets-Sheet 1
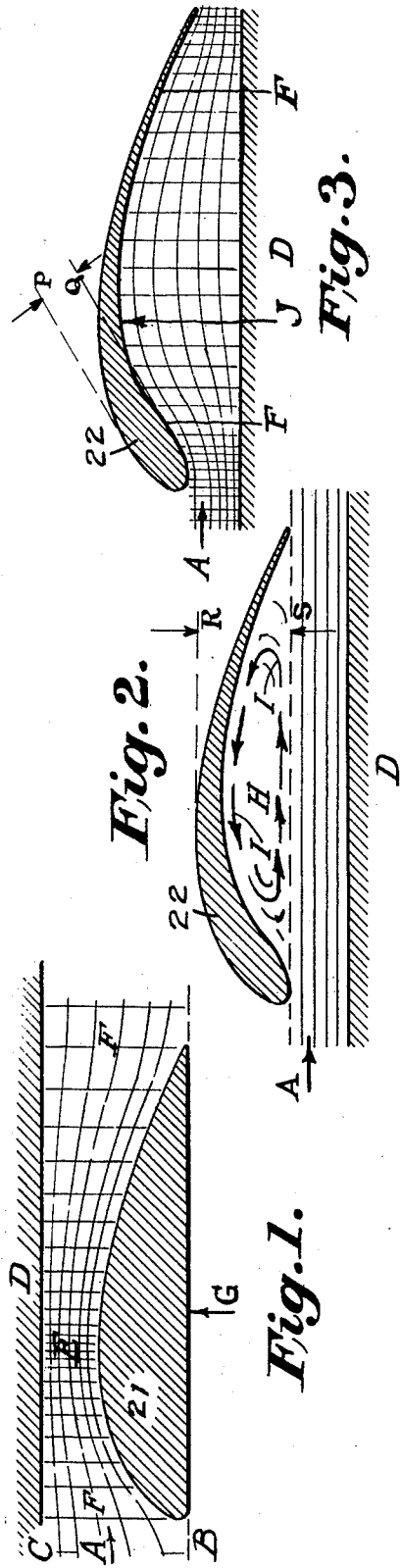
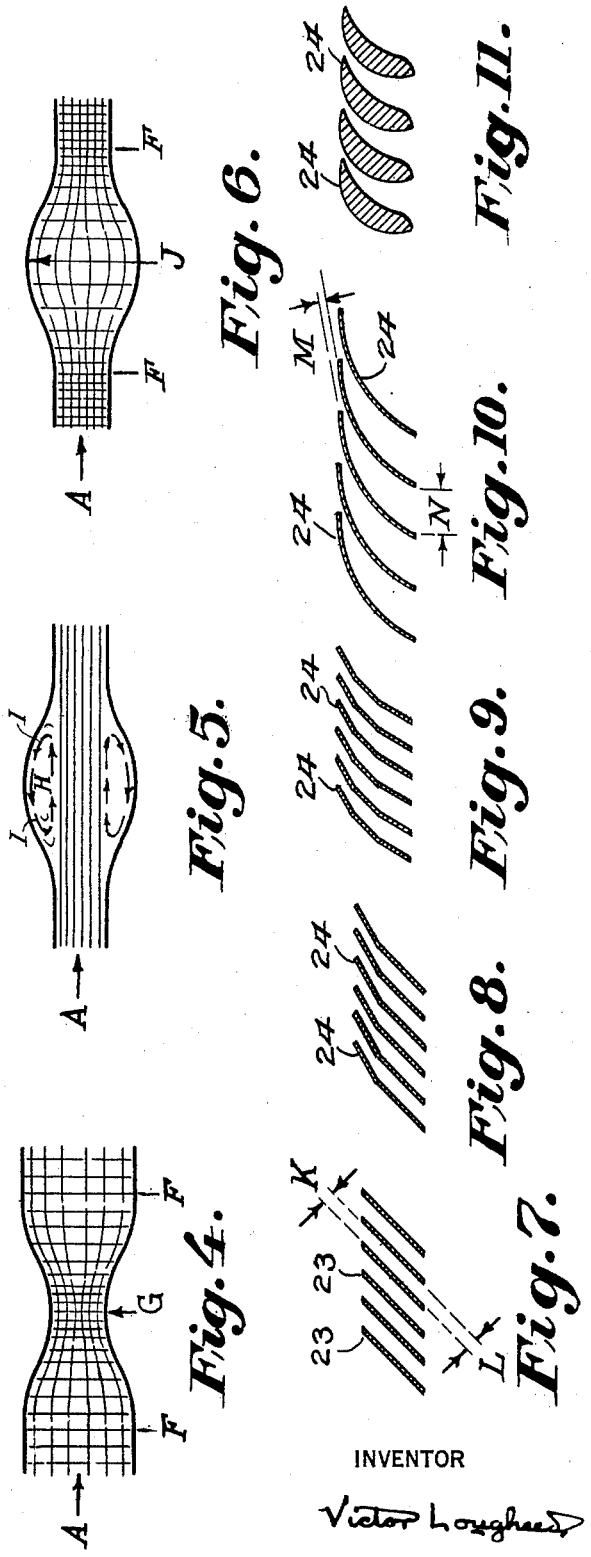
INVENTOR
Victor Lougheed

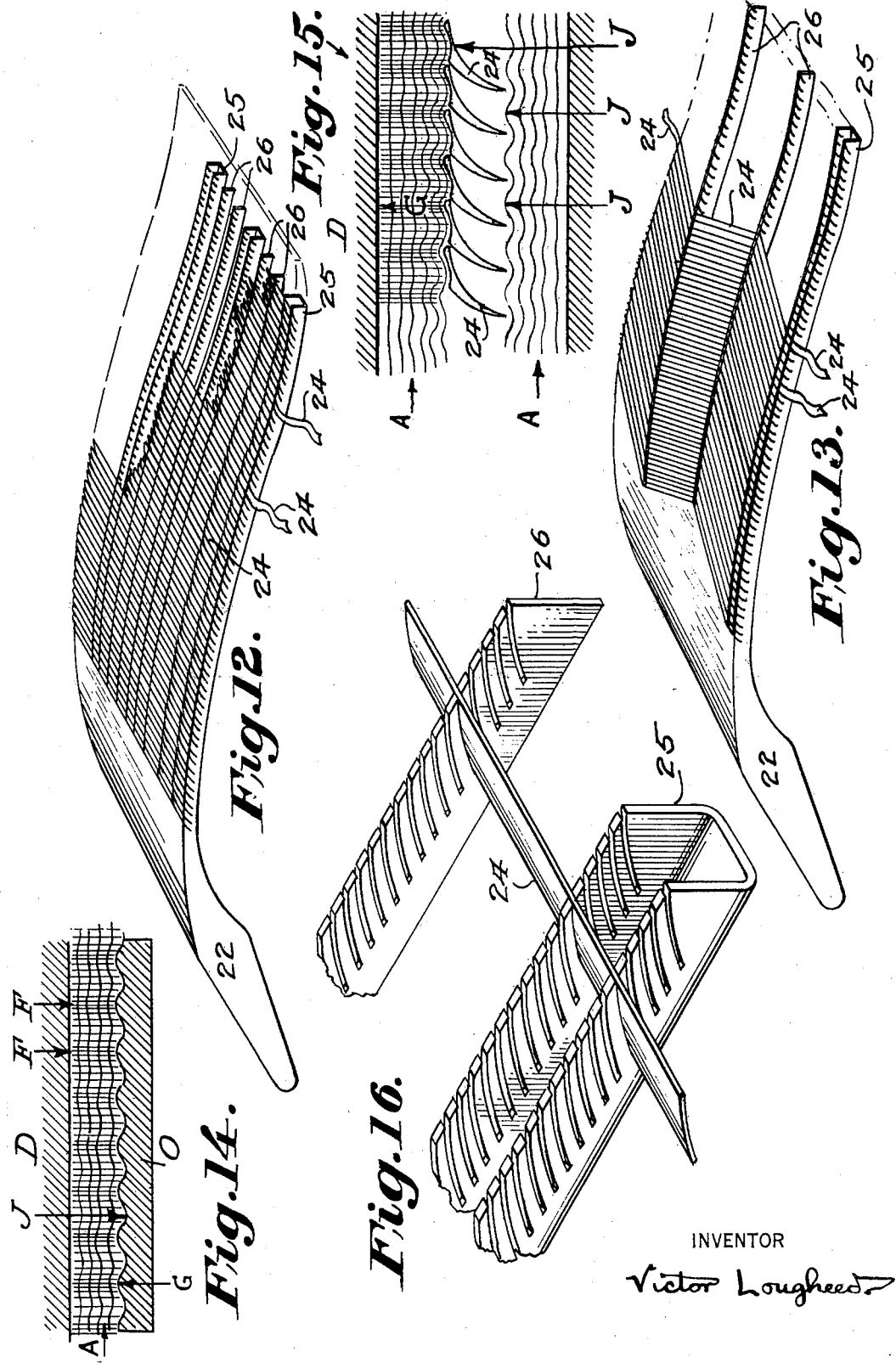

Patented Aug. 15, 1933

1,922,311

UNITED STATES PATENT OFFICE 1,922,311

AEROPLANE WING STRUCTURE AND METHOD OF MAKING THE SAME

Victor Lougheed, Washington, D. C.

Application April 6, 1931. Serial No. 528,108

17 Claims. (Cl. 244—31)

My discovery or invention concerns the control of the relative airflow above and beneath more or less deeply undercambered aeroplane wings. It has for its object increase of the lift and reduction of the drag of such wings, by the provision of structural features designed to confer such control of the relative airflow upon types of undercambered wings which without it are highly inefficient.

In its essential features, throughout its various possible embodiments, my discovery or invention consists in unique combination of surfacing with supporting elements, to provide a relatively-thin wing surfacing built up from separated elements, of certain specified types, alternated with air spaces between them, also of certain defined characteristics.

While, to yield its greatest gains in the improvement of aeroplane efficiency, my discovery or invention calls for combination with the most appropriate wing plan forms and cross sections, its application can be of benefit even in inferior embodiments. I therefore do not limit this specification or the claims thereof to the best embodiments alone.

As pointed out at greater length in the specifications of earlier United States patent applications, Serial Number 328,982, filed by me December 28, 1928; Serial Number 514,619, filed by me on February 9, 1931; and Serial Number 518,554, filed by me February 26, 1931, and also relating to the control of airflow over aeroplane surfaces, all natural flight is accomplished with wings provided with very deep undercamber or concavity, whereas all established artificial flight depends upon the use of sustaining elements the undersides of which are only most slightly undercambered, if at all—being more often flat or even convex.

The reason for this is that, in designing his artificial sustaining elements, man has not heretofore learned how to control the relative airflow to the contour of an undercambered wing. And I have discovered that such flow control is a means for rendering the deeply undercambered wing—useless without it—a much safer and more efficient device for transporting a load upon the air than it is possible to make of the conventional, substantially flat-bottomed "airfoils" of present-accepted and universally-prevailing aeroplane practice.

With the above and other objects in view, my invention consists in the construction and arrangement of parts as will be described more fully hereinafter.

Reference is to be had to the accompanying drawings forming a part of the specification, in which like reference characters indicate corresponding parts throughout the several views, and in which:

Figures 1 to 6, inclusive, are not descriptive of details of my invention, but are schematic illustrations to show functional principles involved in its operation.

Figures 7 to 11, inclusive, are illustrative of structural principles involved in my discovery or invention.

Figure 12 shows a cross-sectional and partial plan view of an aeroplane wing embodying features of my discovery or invention.

Figure 13 shows a portion of an aeroplane wing, in cross section and plan, embodying my invention in one of its possible modifications.

Figure 14 is another schematic illustration of a functional principle.

Figure 15 is a form of my discovery or invention, modified to take the fullest advantage of the principle illustrated by Figure 14.

Figure 16 shows enlarged detail of parts shown in Figure 12.

Referring now to Figure 1, 21 is representative of a standard "airfoil" section, functioning at no angle of incidence in the relative airflow flowing in the direction of the arrow A. Investigation has fully established the fact that such airflow, above the airfoil, for a study of its phenomena and properties can be logically regarded as of limited thickness, extending only from B to C, the air mass at D being too remote from the airfoil 21 to be appreciably affected by its presence, so that the line C may be usefully regarded as the boundary of a solid wall between which and the top of the airfoil 21 the effective aerodynamic action takes place. A consequence of this theory is that the airflow B—C, passing between the airfoil 21 and the air mass D is in the region E, above the airfoil, constrained to undergo a contraction in cross section and a speeding up in velocity—as suggested by the light vertical lines FF, wide spacing of which indicates slowing of the flow, and close spacing of which indicates speeding up of the airflow A. This condition is analogous in condition and effect to that within the well-known "Venturi" tube, of the type illustrated in Figure 4, the airfoil 21 and the air mass D constituting the walls of the venturi. And, quite similarly, the consequence is a conversion of potential to kinetic energy—of flow pressure to flow velocity, with the result of establishing a reduced pressure at E, Figure 1, which allows the normal pressure beneath the airfoil 21 to support its weight, by an unbalance of pressure such as that indicated by the arrow G, Figures 1 and 4.

Through an expansion chamber in a pipe—in contrast to the venturi contraction of Figure 4—an airflow tends ordinarily to pass in the manner illustrated in Figure 5. The flow maintains approximately its original diameter and velocity, and the space around it, H, Figure 5, merely fills up with turbulent air that tends to revolve with the circulatory motion indicated by the arrows II. A similar condition is set up in ordinary attempts to cause an airflow A, Figure 2, to follow the undercamber of a smooth and impenetrable undercambered wing 22, Figure 2. The airflow, between the wing and the air mass D, refuses to expand into the concave space H, which therefore fills up with turbulent air, revolving in the direction of the arrows II, quite as in Figure 5.

This forward rotation of the air under a concave wing has been noted by many investigators; it is always objectionable; no evidence or tests ever have proved that its existence is consistent with efficient wing functioning.

The disclosure that this specification seeks to teach is that when the airflow is so controlled as to be made to follow, without reversal of direction, the undercamber of a concave wing, the resulting condition, illustrated in Figure 3, then becomes analogous to that within the pipe in Figure 6. In both of these cases, as the flow expands, it perforce changes in velocity, and—as suggested by the light vertical lines FF slows down. The immediate consequence is an effective realization of the difficult conversion of kinetic energy into potential energy—of flow velocity into flow pressure, as suggested by the arrows J, Figures 3 and 6.

Combination, therefore, of the top condition illustrated in Figure 1 with the bottom condition illustrated in Figure 3, in an undercambered wing of the general type of that of Figure 3, affords the optimum embodiment of desirable features—a sustaining structure endowed with high lift because of functioning over a greatly-increased bottom pressure as well as under a greatly-reduced top pressure, and possessed of low drag because only its actual moderate thickness P—Q, Figure 3, instead of its considerable projected thickness R—S, Figure 2, need part the airflow to allow it to pass through the air.

The actual realization of the flow essential to such proper functioning of an undercambered wing is a matter of varying difficulty with varying conditions. As I have set forth in United States patent application No. 328,982, filed December 28, 1928; No. 514,619, filed February 9, 1931; and No. 518,554, filed February 26, 1931, flow control may be accomplished, within limits, by suppressing the boundary layer, through causing the airflow to pass over surfaces constituted mainly of vesicular openings within which is trapped air of a pressure differing from that of the relative airflow; or over a surface constituted largely of small openings into which the boundary layer is inspired; or over a surface provided with openings from which issuing air jets speed up and blow off the boundary layer.

With adequate flow control for the given case, the exact shape of the wing section is not critical, but with insufficient flow control, I find by experiment that either the control means or the shape may become critical.

For example, analysis of the characteristics of hundreds of undercambered "airfoils" tested in the wind tunnels of the world, prove that even a smooth surface will for a limited distance control an airflow to its contour, provided the deviation of the surface from the direction of the flow is not more than about three degrees if the airflow is turbulent, and probably some moderately-greater angle, if the airflow is non-turbulent. Hence feeble flow-control means, such as that exerted by a vesicular surfacing, may suffice for low velocities, slight camber, small scale and favorable atmospheric conditions.

For the higher speeds of artificial flight, on the other hand, with large scale factors, and with maximum depth of camber, more energetic means must be provided.

And, particularly, to prevent the detachment of controlled laminar flow by turbulent air conditions, a maximum embodiment of flow-control means is essential.

Such very-energetic flow control I provide, in the functioning of the structure of my discovery or invention, as illustrated in Figures 12, 13, and 16: as modified in Figure 15; and certain principles applying to the design of which are illustrated in Figures 7, 8, 9, 10, 11, and 14.

Referring first to Figures 12 and 16, it is to be noted that the section of this wing, to the rear of its vertex, is honeycombed with passages allowing a seepage of air to pass through from its underside to its topside. This flow is maintained without outside adjuncts in the way of pumps or the like, but occurs solely because of the normal difference of pressure between underside and topside.

In this rearward zone of even a heavily-laden wing, this pressure differential at best is not great—at ordinary flying velocities reaching a maximum of perhaps one half of one percent of one atmosphere, with a minimum greatly lower than this.

To produce the best results it is necessary that the openings through the wing be very small and very numerous—the best condition calling for a texture so fine that viscosity effects within the fluid are greater than the dynamic effects.

To cause an effective flow through such small openings, under the influence of so low a pressure head, demands that the pasages be short, to minimize wall friction. Hence this pervious portion of the wing must be relatively thin—very thin in proportion to the depth of the camber.

The actual form of the passages must be such as to allow entrance to them from the wing underside to be almost normal to the wing underside, in consideration of the fact that the airflow beneath is slowed almost to the point of being stopped. Exit from the passages, on the other hand, on the topside of the wing must be rearward and as nearly as may be tangential to the surface. And a further necessity is that each opening, large on the underside of the wing, be contracted to a very narrow jet opening on the topside.

Referring now to Figure 7, showing a wing section constituted of a system of thin flat parallel inclined bands or tapes, 23, 23, it is manifest that the openings on the topside at K, for the issuing air, cannot be made wider than that at L, on the underside, for the inflowing air. Moreover, the issuing airflow cannot be brought closely tangent to the topside without increasing the objectionable scoop-like departure from normal to the surface, of the intake ends of the passages.

To allow the intake ends of the passages to be wider than their outflow ends, and to present the intake ends of the passages at a different angle to the bottom surface from that presented by the outflow ends to the top surface, it becomes a geometrical necessity either to bend the partitions between the passages as in Figures 8, 9, or 10, or to make them massive and of irregular thickness, as in Figure 11. The latter procedure adds undesirably to weight, and must either constrict the passages or reduce their number.

I therefore prefer, as the most effective in functioning and the most practical to construct, the structure illustrated in Figures 10, 12, and 16, in which the small exit opening M is seen to be very much narrower than the intake opening N.

The practical difficulties in the way of building up such a structure have been very baffling, if it is to be durable, reliable, and effective under the varied weather and other conditions of aircraft operation, but a solution of these difficulties is relized in the structure of Figures 12 and 16, in which the elements 24, 24, across the airflow, are flexible bands (preferably rubberized fabric tapes) mounted in transverse elements, parallel to the airflow, and provided with curved slots into which the tapes fit and within which they are retained.

These transverse elements can be most conveniently of two types—strong rib or supporting elements 25, 25, on which the weight of the machine is supported; and light spacer elements 26, 26, introduced at intervals sufficiently close to compel the tapes to keep the proper contour and to suppress any tendency they may be found to possess, of going into harmonic vibrations.

An undulant surface, O, Figure 14, transversed by an airflow, if the flow follows its contours, will operate like a series of venturis and expansion chambers, and, accordingly, will impose upon the stream of air, pressure and velocity changes as indicated by the arrows G and J, and by the vertical lines FF, Figure 14.

Referring next to Figure 15, the underside flow past the edges of the elements 24, 24 undulates over these edges as in the case of the continuous undulant surface of Figure 14. The result is the establishment of positive pressures in the relative airstream, at JJ. This is desirable, as tending to force the air to flow into the passages between 24, 24. But the similar condition, on the topside, opposing the outflow of the air from the passages, can be very objectionable, in view of the exceedingly feeble pressure differential that, as has been explained, is all that there is to force the air through the passages. Hence modification of the elements 24, 24, into the form shown in Figure 15, can be of advantage in extreme cases because of its placing the issuing air jets in the topside zones of reduced pressure G rather than in those of increased pressure J.

Disproportionate lowering of resistance is in certain cases attained by causing an airflow to impinge on edges slanted across it rather than upon edges squarely transverse to it. Therefore a slanted or herringbone arrangement of the band or tape elements 24, 24, as depicted in Figure 13, may in favorable conditions afford an important additional lowering of resistance or drag, in the application of my discovery or invention.

It will be understood that the above description and accompanying drawings comprehend only the general and preferred embodiment of my invention and that the various minor changes in details of construction, proportion, and arrangement of parts may be made within the scope of the appended claims and without sacrificing any of the advantages of my invention.

What I claim is:

1. A wing structure consisting of relatively-narrow substantially-parallel closely-spaced flexible bands supported in rib-like members having transverse curved slots therein holding said bands to a desired curvature and location.

2. The combination of an undercambered wing section with a wing structure of relatively-narrow substantially-parallel closely-spaced flexible bands supported in rib-like members provided with transverse curved slots to hold said bands therein to desired curvature spacing and location.

3. A wing structure consisting of a series of rib-like members placed parallel to the airflow and having projections thereon each of which projections being suitably curved and spaced from its fellows on either side so as to leave slots therebetween embracing transverse tapes or bands of freely flexible material shaped by said curved slots.

4. A wing structure consisting of rib-like members with elements thereof each of said elements being suitably curved and spaced from its fellows on either side so as to leave spaces therebetween embracing transverse tapes or bands of readily flexible material so shaped by said slots as to leave between said tapes or bands relatively-wide openings normal to the bottom surface of the wing and relatively-narrow openings tangent to the top surface of the wing.

5. A wing structure consisting of supporting means and thin narrow parallel multiple freely flexible bands separated by said supporting means to leave interspaces between them, said bands being so bent and spaced as to render the openings from the wing underside into interspaces relatively-wide and the openings on the wing topside relatively-narrow.

6. A wing structure consisting of supporting means and thin narrow parallel multiple bands of freely flexible material separated by said supporting means to leave interspaces between them, said bands being so bent and spaced as to render the openings from the wing underside into the interspaces relatively-wide and at approximately right angles to the wing underside and to render the outlets from the interspaces on the wing topside relatively-narrow and opening rearwardly at a low angle closely tangential to the wing topside.

7. A wing structure consisting of supporting means and thin parallel freely flexible multiple bands separated by said supporting means to leave interspaces between them, said bands being so bent and spaced by said supporting means as to render the openings from the wing underside into the interspaces relatively-wide and the openings on the wing topside relatively-narrow.

8. A wing structure consisting of supporting means and thin narrow parallel flexible multiple bands separated by said supporting means to leave interspaces between them, said bands being so bent and spaced by said supporting means as to render the openings from the wing underside into the interspaces relatively-wide and at approximately right angles to the wing underside and to render the outlets from the interspaces on the wing topside relatively-narrow and opening rearwardly at a low angle closely tangential to the wing topside.

9. A deeply undercambered wing made relatively-thick and impervious to air forward of its vertex and the portion rearward of its vertex made relatively-thin, said rearward portion comprising supporting means and freely flexible bands curved and separated by said supporting means to form slots transverse to the airflow said slots being relatively-wide on the wing underside and relatively-narrow on the wing topside.

10. A deeply-undercambered wing made relatively-thick and impervious to air forward of its vertex and the portion rearward of its vertex made relatively-thin, said thin portion comprising supporting means and freely flexible bands curved and separated by said supporting means to form closely-spaced slots crossing the airflow said slots being relatively-wide and opening at approximately right angles from the wing underside and being relatively-narrow and opening rearwardly at low angles closely tangential to the wing topside.

11. An undercambered wing made relatively-thick and impervious to air forward of its vertex and the portion rearward of the vertex made thin relatively to the depth of the camber, said rearward portion comprising a series of rib-like members having transverse slots therein, said members being positioned parallel to the airflow and extending out from said forward portion, and freely flexible tapes placed in said rib slots thereby holding said tapes to a desired curvature and location to form slots closely-spaced across the airflow said slots being relatively-wide and opening at approximately right angles out of the wing underside and being relatively-narrow and into the wing topside opening rearwardly at low angles closely tangential to the wing topside.

12. An undercambered wing structure constituted of a portion forward of the vertex impervious to air and relatively-thick and massive and a portion rearward of the vertex relatively-thin and built up of rib-members supporting bands of flexible material narrower than the wing camber and separated by interspaces relatively-wide on the wing underside and relatively narrow and opening tangentially rearward through the wing topside.

13. A wing structure constituted of supporting means and substantially-parallel relatively-narrow and slightly separated overlapping freely flexible bands curved and spaced by the supporting means to form interspaces between them relatively-wide on the underside of the wing and relatively-narrow on the topside of the wing.

14. A wing structure consisting of substantially-parallel relatively-narrow and slightly-separated overlapping curved bands of readily flexible material with the interspaces between them relatively-wide and opening normally from the underside of the wing and relatively-narrow and opening tangentially rearward on the topside of the wing.

15. An undercambered wing structure consisting of a portion forward of the vertex impervious to air and relatively-thick and massive and a relatively-thin portion rearward of the vertex constituted of relatively-narrow and slightly-separated overlapping curved bands of freely flexible material with the interspaces therebetween relatively-wide and opening at substantially right angles from the underside of the wing and relatively-narrow and opening tangentially rearward on the topside of the wing.

16. A wing structure consisting of substantially-parallel relatively-narrow and slightly-separated overlapping flexible tapes, and rib-like mounting means conforming said tapes to a desirable curvature whereby the interspaces between said tapes are relatively-wide on the underside of the wing and relatively-narrow on the topside of the wing.

17. An undercambered wing structure consisting of a relatively-thick and massive portion forward of the vertex, means making said portion impervious to air, a relatively-thin portion rearward of the vertex comprising relatively-narrow and slightly separated overlapping flexible tapes, and rib-like mounting means conforming said tapes to a desirable curvature whereby the interspaces between said tapes are relatively-wide and opening at substantially right angles from the underside of the wing and relatively-narrow and opening tangentially rearward on the topside of the wing.

VICTOR LOUGHEED.